United States Patent Office 3,383,345
Patented May 14, 1968

3,383,345
EPOXY-COAL TAR FILM-FORMING
COMPOSITIONS
Joseph A. Bauer, Louisville, Ky., assignor to Porter Paint
Company, a corporation of Kentucky
No Drawing. Filed Oct. 26, 1964, Ser. No. 406,558
1 Claim. (Cl. 260—22)

ABSTRACT OF THE DISCLOSURE

A composition to be applied in thin films, containing in a solvent, coal tar, a polycarboxylic acid and an epoxy ester conferring good brushing properties on the composition without film sagging.

---

This invention in one of its aspects pertains to novel products derived from distillation products of coal and epoxide resins. In another of its aspects the invention relates to film-forming compositions of these novel products.

There are two patents directed to epoxy resin coal distillation compositions. In U.S. 2,765,288 an epoxy ether resin such as a diglycidyl ether of a polyhydric phenol or alcohol is admixed with a coal tar pitch and a curing agent. The compositions contemplated by that patent are combinations of 15 to 50 parts by weight epoxy ether resin with from 85 to 50 coal tar pitch, the total being 100. Sufficient curing agent, such as polyamine, to cross link the composition is employed. The cured composition forms a tough, corrosion-resistant rubbery film in about twenty-four hours.

In U.S. 2,980,601 a liquid refined coal tar, not considered analogous to coal tar pitch by the patentee, is brought together with a polyfunctioned aliphatic amine and an aliphatic or aromatic ketone. According to the patentee the primary aliphatic polyamine reacts with the ketone to form a condensation product having a plurality of tertiary amino groups. This condensation product is combined with 5 to 6 parts liquid refined coal tar, per part of condensate by weight to form a curing agent for glycidyl polyethers of polyhydric alcohols and phenols. This curing agent, when combined with the epoxide resin forms a hard tough high gloss enamel-like film in 16 to 24 hours.

The coal tar pitch-epoxy composition of U.S. 2,765,288 and the ketone modified amine-liquid refined coal tar-epoxy composition described in U.S. 2,980,601 are outstanding compositions for many uses, particularly in industrial applications. However, application problems have not been completely overcome. In addition for some industrial applications for compositions of this type more acid resistance is demanded than is conferred by epoxy-coal tar composition now in use.

The application of epoxy-coal tar compositions, either by brushing or by spraying presents a problem due to required application viscosities of these materials. Since both the epoxide resin and the coal tar compound have high initial viscosities, blends of these compositions in proper proportions for coating compositions cannot be brushed with ease.

Epoxy-coal tar compositions now in use exert a drag on the brush, particularly on overlap. Brushing of overlap is similar to brushing partially dried shellac or lacquer. The additional energy required for brushing makes it quite difficult to brush with existing epoxy-coal tar compositions for the long periods required in large vessels of industrial plants. If these compositions are thinned with sufficient solvent for easy brushing low solids compositions formed result in less desirable films.

Epoxy-coal tar compositions used at present have been thinned with from a pint to a quart of solvent per gallon of epoxy-coal tar composition to form spray-on film-forming compositions. However, at these spray application viscosities it is difficult to apply the composition in thick films without film sagging. This means that for industrial use two coats with interim drying are used when thick films are preferred. From a commercial point of view two coat systems are not desirable.

In accordance with the invention certain polycarboxylic acid materials are employed in lieu of the ketone-amine condensate of U.S. 2,980,601. In addition, if, instead of the great variety of glycidyl polyethers and esters of U.S. 2,980,601, an expoxidized long chain fatty acid ester of a polyhydric alcohol is used, a wider range of coal tar distillate compositions, not previously considered analogous, can be employed. Thus any of the three heavy fractions obtained by the distillation of coal can be used herein.

The destructive distillation of bituminous coal results in a light oil, a middle oil and three heavy fractions. These heavy fractions are a coal tar pitch, as disclosed in U.S. 2,765,288, a liquid refined coal tar, as employed in U.S. 2,980,601 and a heavy oil, containing cresote, anthracene and similar oils.

This invention contemplates as a coating composition, a film-forming solution of one of the three heavy fractions obtained in the destructive distillation of bituminous coal; an epoxidized ester of an unsaturated fatty acid and a polyhydric alcohol; and a high molecular weight polycarboxylic acid. When necessary, sufficient solvent is used to confer application viscosity on the composition. The term "polycarboxylic acid" includes high molecular weight acids per se, acid adducts and polyesters having at least two carboxyl groups. Prior art acid compositions do not suggest the use of these acid materials to prepare compositions of the type set forth in U.S. 2,765,288 and U.S. 2,980,601. Since refined coal tar and coal tar pitch are not analogous the use of either of these compositions as set forth herein has not been obvious, and particularly the formation of coal tar compositions which can be much more readily applied by brushing and spraying than prior art compositions.

A desirable acid for use herein is chlorendic acid or anhydride. However, any of the known acids, adducts, or acid terminated polyesters can be used such as phthalic acid, hexahydrophthalic acid, tetrachlorophthalic acid, carbic acid, monochlorophthalic acid, alkenyl succinic acids, e.g. propenyl succinic acid, decenyl succinic acid, dodecenyl succinic acid, a maleic or fumaric acid adduct of rosin, the maleic or fumaric adduct of an unsaturated oil or fatty acid, the maleic acid adduct of terpene sold as Petrox. Carboxy terminated polyesters include reaction products of polyols with one mol of a polycarboxylic acid per hydroxyl group. For example, one mol of glycol with two mols of phthalic anhydride at a low temperature, one mol of erythritol with four mols of maleic, glycerin with three mols of chlorendic acid, etc. A preferred polycarboxylic acid ester is an ester formed with pentaerythritol and a total of four mols of phthalic and chlorendic acids or anhydrides. The pH strength of the acidic ingredient in water at a concentration of 1 percent or more should be no higher than about 4.7 preferably less, and about 4.5. The molecular weight of the acid should be at least 165 with two or more reactive carboxyl groups, and desirably at least 180.

The third component in the composition of this invention is an epoxidized acid ester of a polyhydric alcohol, the ester containing non-terminal epoxy groups, i.e. oxirane rings in the acyl substituents. Epoxy esters are obtained by epoxidizing carboxylic acid esters containing olefinic unsaturation in the acyl groups with per fatty acids, such as peracetic acid or performic acid, by methods known in the art. See U.S. 2,485,160 and 2,569,-502.

Since polyhydric alcohol unsaturated fatty acid esters are used, the epoxidized polyester conveniently will be an epoxidized oil, for example, epoxidized peanut, cottonseed, corn, soybean, safflower, walnut, rapeseed, castor, linseed, perilla, menhaden, sardine, herring, pilchard, hempseed, sesame, and tall oil. The fatty acids found in these oils are mixtures of saturated and unsaturated types. They contain from 12 to 26 carbon atoms per acid radical, and the iodine value of the oils should be at least 90. The epoxy ester contains four to ten percent internal oxirane value after epoxidation.

In preparing the coal tar compositions of this invention the epoxy ester and carboxylic acid compound are used in quantities such that there is at least one carboxyl equivalent of acid compound per oxirane equivalent epoxidized ester composition. With this epoxy-acid material there is mixed 60 to 600 percent by weight, on a solids basis, preferably 100 to 600 percent, of the heavy fraction from coal distillation; and, of course, fillers and pigments such as mica, magnesium silicate, titanium dioxide, etc., can be employed.

Various aspects of this invention can perhaps best be understood by reference to the following specific examples, which, of course, are for the purpose of illustration only.

The cutback pitch employed in the examples was a high free-carbon coal tar pitch in solution in light aromatic solvents having the following properties:

| | |
|---|---|
| Specific Gravity @ 15/15 | 1.156 |
| Weight/gallon | 9.6 |
| Volatiles _____percent by weight | 26 |
| Non-volatiles _____percent by weight | 74 |
| Distillation on non-volatiles | |
| Initial B.P. 90° C. 50% | 110 |
| Final | 170 |
| Melting Point of residue (std. Cube) ___deg | 90 |
| Flash point _____red label. | |

The liquid coal tar used in the examples was a refined coal tar having the following distillation range:

| | Percent |
|---|---|
| Below 210° C. | 15.1 |
| 210–235° C. | 7.0 |
| 235–270° C. | 8.5 |
| 270–315° C. | 9.3 |
| 315–355° C. | 8.5 |
| | 48.4 | and

| | |
|---|---|
| Specific gravity | 1.102 |
| Weight/gallon | 9.2 |
| Scott viscosity @ 35° C. | 4.0 |

The epoxy ester employed in the first five examples was an epoxidized oil prepared by the reaction of isolated double bonds of soybean oil with 42 percent peracetic acid at a temperature sufficiently low so that resulting acetic acid does not react with resulting epoxide groups. The epoxidized soybean oil contains 6.3 percent oxirane oxygen.

The polyester employed in Examples 1 through 5 is a low molecular weight ester made by reacting in the following ratios, 1 mol of pentaerythritol, with 1.3 mols of phthalic anhydride and 2.7 mols of chlorendic anhydride. This polyester has an acid value of 170 and a Gardner-Holdt viscosity of X–Z at 25° C. (60 percent solids).

Example 1

| Component A: | Parts by weight |
|---|---|
| Epoxidized soybean oil solution (90 percent solids) | 100 |
| Coal tar pitch cutback (74 percent solids) | 200 |

| Component B: | Parts by weight |
|---|---|
| Acid terminated polyester solution (60 percent solids) | 150 |
| Mica (ground to not larger than 10 micron particles) | 100 |
| Solvent (Cellosolve-2-ethoxy ethanol) | 25 |

Components A and B, using pounds, were mixed separately in conventional paint mixing equipment and were then stirred together to form a coating composition with the consistency of a paint having a Brookfield viscosity of 41,500 c.p.s.–4 R.M.S., No. 5 Spindle. This composition was found to brush very easily to a good film build on metal plates. A film baked for two hours at 350° F. had a pencil hardness of 4H. An air dried film had a pencil hardness of 6B the first two days but cured to a hardness of H in about four or five days.

When thinned with ½ pint of a mixture of Cellosolve and xylene per gallon the composition also sprayed well on metal panels. All three of these films when cured were not only hard but extremely resistant to acid materials.

Example 2

| Component A: | Parts by weight |
|---|---|
| Epoxidized soybean oil solution (90 percent solids) | 200 |
| Coal tar pitch cutback (74 percent solids) | 343.2 |

| Component B: | Parts by weight |
|---|---|
| Acid terminated polyester solution (60 percent solids) | 366 |
| Mica (ground to not larger than 10 microns) | 300 |
| Silica (powdered) | 94 |
| Cellosolve | 92 |

This composition was formulated, in a 1395 pound batch according to Example 1. This composition was less viscous than the Example 1 composition (Brookfield viscosity 23,000 c.p.s.–4 R.M.S., No. 5 Spindle). Films of the composition also had less sheen than those of the composition of Example 1. The composition sprayed easily without thinning to excellent film build. When baked for two hours at 350° F. the film had the following properties:

| | |
|---|---|
| Pencil hardness | 6H (24 hour chemical spot test). |

Resistance tests:
| | |
|---|---|
| Nitric acid— | |
| 36 percent | Not affected. |
| 56 percent | Not affected. |
| Hydrochloric acid— | |
| 19 percent | Not affected. |
| 30 percent | Not affected. |
| Sulfuric acid— | |
| 48 percent | Not affected. |
| 77 percent | Not affected. |
| Sodium hydroxide— | |
| 40 percent | Very slight. |
| Water | Not affected. |
| Gasoline | Slight. |
| Xylene | Slight. |

Example 3

| Component A: | Parts by weight |
|---|---|
| Epoxidized soybean oil solution (90 percent solids) | 200 |
| Liquid coal tar | 202 |

| Component B: | Parts by weight |
|---|---|
| Polyester solution (60 percent solids) | 366 |
| Mica (powder) | 200 |
| Silica (powder) | 94 |
| Cellosolve | 92 |

Using pounds, a batch of this composition was blended following Example 1. The liquid coal tar resulted in a much less viscous composition than the cutback coal tar pitch. Films of this composition, baked 2 hours at 350° F. also had better properties.

Hardness _____ 7H (24 hour chemical spot test).

Resistance tests:
  Nitric acid—
    36 percent _____ Not affected.
    56 percent _____ Not affected.
  Hydrochloric acid—
    19 percent _____ Not affected.
    30 percent _____ Not affected.
  Sulfuric acid—
    48 percent _____ Not affected.
    77 percent _____ Not affected.
  Sodium hydroxide—
    40 percent _____ Very slight.
  Water _____ Not affected.
  Gasoline _____ Very slight.
  Xylene _____ Slight.

Example 4

Component A:               Parts by weight
  Epoxidized soybean oil solution (90 percent solids) _____ 17.5
  Coal tar pitch cutback (74 percent solids) ___ 274

Component B:               Parts by weight
  Polyester solution (60 percent solids) _____ 32.9
  Mica (powder) _____ 20
  Magnesium silicate _____ 7.5
  Cellosolve _____ 5.2

Following Example 1 a film forming composition, in pounds, was made from the above components. This composition, containing 76.7 cut back coal tar pitch by weight, was more difficult to brush than that of Example 1. Its brushing properties were still superior to prior art compositions containing coal tar pitches. The composition had a viscosity (Brookfield) of 5700 c.p.s.–4 R.M.S., No. 5 Spindle. A 5 mil film cured at room temperature had a hardness of 4B in four days, and was extremely acid resistant.

Example 5

Component A:               Parts by weight
  Epoxidized soybean oil solution (90 percent solids) _____ 200
  Liquid coal tar _____ 343

Component B:               Parts by weight
  Polyester solution (60 percent solids) _____ 366
  Mica (powder) _____ 200
  Silica (powder) _____ 75
  Cellosolve _____ 92

This composition was formulated according to Example 1. The resulting composition (59.7% solids by volume) had a viscosity of 98KU. This composition (Composition X) brushed well, and films of the composition had outstanding acid resistance.

Example 6

Compositions were made according to Example 5, U.S. 2,980,601 (Example VI) and U.S. 2,765,288 (Example IV) as Compositions X, Y, and Z respectively.

Compositions X, Y, and Z were both brushed and sprayed on test panels. They were brushed on at 75 percent solids on a weight basis.

TABLE A.—BRUSHING TEST

| Film Former | Rating | Reason |
| --- | --- | --- |
| Composition X | Excellent | Goes on smoothly like a house paint. |
| Composition Y | Poor | Drag on brush. |
| Composition Z | do | Sticky. |

For spraying, Composition X was thinned with ½ pint solvent (a Cellosolve, xylene mixture) per gallon. Composition Y was thinned with one quart per gallon, whereas Composition Z was thinned with one pint per gallon.

TABLE B.—SPRAYING TEST

| Film Former | Rating | Reason |
| --- | --- | --- |
| Composition X | Excellent | Good film build. |
| Composition Y | Poor | Breaks into separate particles. |
| Composition Z | do | Poor sag resistance. |

Example 7

To show acid resistance of films made from Compositions X, Y, and Z, the following table is given. In rating these films, 10 is excellent; 5 is poor; and 0 is failure. Films were air dried and baked two hours at 350° F.

TABLE C.—ACID RESISTANCE SPOT TEST

| Films | Lactic 20% | Acetic 5% | Acetic 10% | Acetic 20% | $HNO_3$ 36% | $HNO_3$ 56% | HCl 19% | HCl 36% | $H_2SO_4$ 48% | $H_2SO_4$ 77% |
| --- | --- | --- | --- | --- | --- | --- | --- | --- | --- | --- |
| Comp. X (Baked) | 10 | 10 | 10 | 10 | 10 | 10 | 10 | 10 | 10 | 10 |
| Comp. Y (Baked) | 5 | 8 | 6 | 6 | 7 | 5 | 10 | 9 | 7 | 7 |
| Comp. Z (Baked) | 9 | 10 | 9 | 9 | 10 | 9 | 10 | 10 | 8 | 9 |
| Comp. X (7 day cure) | | 9 | | | 9 | 9 | 10 | 10 | 10 | 9 |
| Comp. Y (7 day cure) | | 8 | | | 7 | 0 | 8 | 9 | 8 | 8 |
| Comp. Z (7 day cure) | | 9 | | | 7 | 7 | 10 | 10 | 10 | 9 |

Example 8

Component A:               Parts by weight
  Epoxidized soybean oil (100 percent solids, 7.0 percent oxirane oxygen) _____ 180
  Liquid coal tar _____ 202
  Xylene _____ 20

Component B:               Parts by weight
  Dodecenyl succinic anhydride _____ 256.8
  Xylene _____ 171.2
  Powered mica _____ 200
  Magnesium silicate _____ 100
  Amino methyl phenol catalyst _____ 1
  Cellosolve _____ 60

Components A and B, in pounds were blended according to Example 1 to form a composition having 72 percent solids by volume. Films of this composition, baked 2 hours at 350° F. had a pencil hardness of H.

Example 9

Component A:               Parts by weight
  Epoxidized soybean oil (100 percent solids, 7.0 percent oxidrane oxygen) _____ 180
  Cut back pitch _____ 343
  Xylene _____ 20

Component B:               Parts by weight
  Dodecenyl succinic anhydride _____ 256.8
  Xylene _____ 171.2
  Powdered mica _____ 200
  Magnesium silicate _____ 100
  Amino methyl phenol catalyst _____ 1
  Cellosolve _____ 60

Components A and B, in pounds were blended according to Example 1 giving 64.25 percent solids by volume. Films of this composition, baked 2 hours at 350° F. had a pencil hardness of 5H.

Example 10

Component A: Parts by weight
- Epoxidized soybean oil (100 percent solids 6.3% oxirane oxygen) — 180
- Liquid coal tar — 202
- Xylene — 20

Component B: Parts by weight
- Dodecenyl succinic anhydride — 256.8
- Xylene — 171.2
- Powdered mica — 200
- Magnesium silicate — 100
- Dimethyl amino methyl phenol catalyst — 1
- Cellosolve — 60

Components A and B, in pounds were blended according to Example 1 giving 72 percent solids by volume. Films of this composition, baked 2 hours at 350° F. had a pencil hardness of 2H.

Example 11

Component A: Parts by weight
- Epoxidized soybean oil (100 percent solid, 7.0% oxirane oxygen) — 180
- Liquid coal tar — 202
- Xylene — 20

Component B: Parts by weight
- Hexahydro phthalic anhydride — 133
- Xylene — 89
- Powdered mica — 122.5
- Magnesium silicate — 45.8
- Dimethyl amino methyl phenol catalyst — .5
- Cellosolve — 50

Components A and B, in pounds were blended according to Example 1 giving 75 percent solids by volume. Films of this composition, baked 2 hours at 350° F. had a pencil hardness of H. These films showed no effect in spot tests using 19% and 35% HCL. They were only very slightly attacked by 56% $HNO_3$ and 48% and 77% $H_2SO_4$.

Example 12

Component A: Parts by weight
- Epoxidized soybean oil (100 percent solids, 6.3% oxirane oxygen) — 180
- Cutback coal tar pitch — 343
- Xylene — 20

Component B: Parts by weight
- Hexahydro phthalic anhydride — 133
- Xylene — 89
- Powdered mica — 122.5
- Magnesium silicate — 45.8
- Dimethyl amino methyl phenol catalyst — 0.5
- Cellosolve — 50

Components A and B, in pounds were blended according to Example 1 giving 64.2 percent solids by volume. Films of this composition, baked 2 hours at 350° F. had a pencil hardness of 4H. These films showed no effect in spot tests using 19% and 36% HCL. They were very slightly attacked by 56% $HNO_3$ and 48% and 77% $H_2SO_4$. In the preceding examples the coal tar pitch composition was mixed with the epoxidized oil. The following examples show that the coal tar pitch can be mixed with the acid compound rather than as the epoxidized oil.

Example 13

Component A: Parts by weight
- Epoxidized soybean oil solution (90 percent solids) — 200
- Mica (powder) — 200
- Silica (powder) — 94
- Cellosolve — 92

Component B: Parts by weight
- Polyester solution (60 percent solids) — 366
- Liquid coal tar — 202

Components A and B, in pounds, were mixed separately in conventional paint mixing equipment. The two components were then stirred together to form a coating composition having a solids by volume of 68 percent. Properties of films of this composition baked 2 hours at 350° F. were very similar to those in Example 3.

Example 14

Component A: Parts by weight
- Epoxidized soybean oil solution (90 percent solids) — 200
- Mica (powder) — 200
- Silica (powder) — 94
- Cellosolve — 92

Component B: Parts by weight
- Acid terminated polyester solution (60 percent solids) — 366
- Coal tar pitch cut back — 343

Components A and B, in pounds, were mixed separately in conventional paint mixing equipment. The two components were then stirred together to form a coating composition having a solids by volume of 59.4 percent. Properties of films of this composition baked 2 hours at 350° F. were very similar to those in Example 2.

The foregoing examples show that compositions prepared according to the practice of this invention have unexpectedly good brushing and spraying properties for a coal tar composition. In addition films of these coal tar epoxidized oil-polycarboxylic acid compositions have outstanding acid resistance. Such compositions have many industrial uses, for example, as coatings for the inside of storage tanks for acidic materials, as coatings for outside surfaces of pipes and vessels of industrial plants in acidic atmospheres, and the like. Such uses, as well as variations in the compositions themselves will occur to those skilled in the art. For example, in lieu of a drying oil, various epoxy esters of alcohols such as glycerin and erythritol and unsaturated fatty acids such as aliphatic acids having eight to eighteen carbon atoms in the aliphatic chain can be used. In addition it will be understood that the amount of solvent added will depend upon the desired application viscosity. Generally on a weight basis the compositions of the invention will be at 60 to 85 solids. In other words 15 to 40 weight percent of the composition will be solvent. The quantity of solvent employed, various additives, and other obvious ramifications are deemed to be within the scope of this invention.

What is claimed is:

1. A film-forming composition comprising a solution of (1) liquid refined coal tar, (2) an epoxidized soybean oil and (3) a polycarboxylic acid material, which in combination with each other at an application solids concentration in the range of 60 to 85 percent forms a film-forming solution which on application does not result in film sagging prior to curing, thereby conferring improved brushing properties on the composition; the polycarboxylic acid material being the carboxyl-containing reaction product of 1.0 mol pentaerythritol, 1.3 mols phthalic anhydride and 2.7 chlorendic anhydride; the film-forming composition containing 15 to 40 weight percent solvent, the polycarboxylic acid material being present in an amount of at least one equivalent of acid per epoxide equivalent of ester; and the epoxy-acid material being mixed with 60 to 600 percent by weight of the coal tar on a solids basis.

(References on following page)

References Cited

UNITED STATES PATENTS

| | | | |
|---|---|---|---|
| 2,765,288 | 10/1956 | Whittier et al. | 260—28 |
| 2,956,034 | 10/1960 | Simpson | 260—28 |
| 2,980,601 | 4/1961 | Meigs | 260—47 |
| 3,015,635 | 1/1962 | Bradley et al. | 260—28 |
| 3,190,845 | 6/1965 | Goodnight | 260—28 |
| 3,218,274 | 11/1965 | Boller et al. | 260—22 |
| 3,287,296 | 11/1966 | Wittner | 260—28 |

DONALD E. CZAJA, *Primary Examiner.*

HOSEA E. TAYLOR, JR., *Examiner.*

R. W. GRIFFIN, *Assistant Examiner.*